United States Patent Office 2,708,573
Patented May 17, 1955

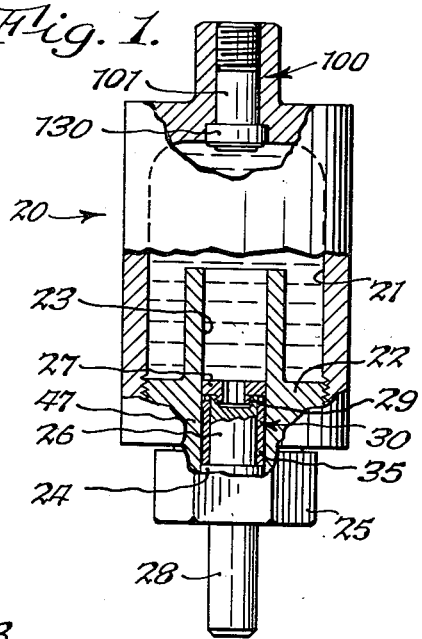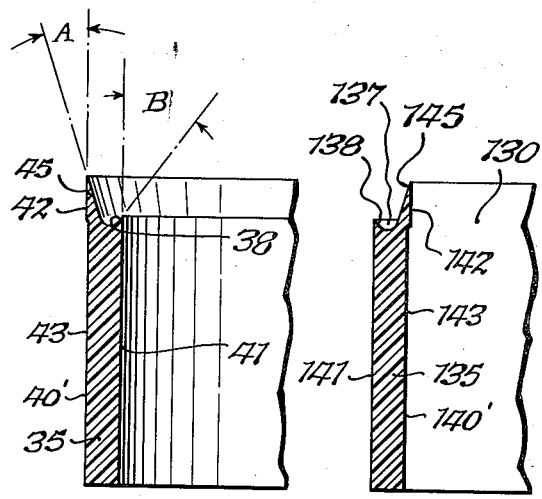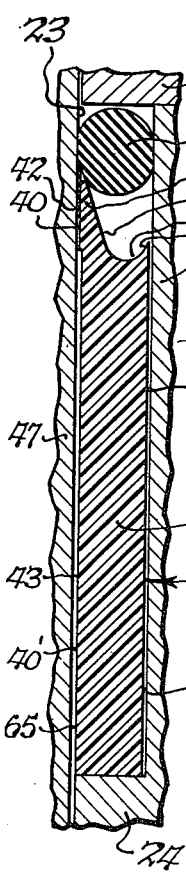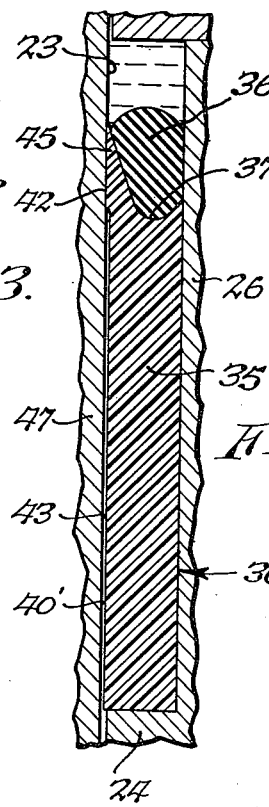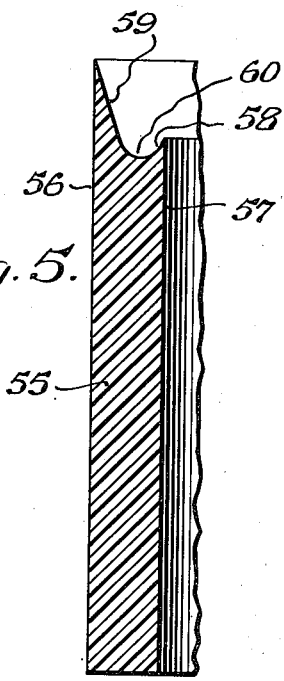

2,708,573

SEAL FOR LIQUID SPRINGS

Charles Lee Rovoldt, North Tonawanda, N. Y., assignor to Wales-Strippit Corporation, North Tonawanda, N. Y., a corporation of New York Application July 10, 1952, Serial No. 298,094

7 Claims. (Cl. 267—1)

The present invention relates generally to high pressure liquid seals and more particularly to a seal against leakage, between two relatively reciprocating parts, of liquid that may be subjected to extremely high pressure. In a still more specific aspect the invention relates to a seal suitable for use in liquid springs and like applications.

In a liquid spring, the compressibility of a confined liquid is utilized to effect the desired resilient action. In such a spring, a small body of liquid is employed, in some cases as little as two ounces. For instance, in one typical application to a small liquid spring, two ounces of liquid is compressible from 12 to 20% by volume at an operating pressure of as much as 50,000 lbs. per square inch by a piston having a diameter of one half inch at a stroke of say ¾". Obviously, in such an installation, the loss of a few cubic millimeters of liquid is sufficient to cause the device to lose power and render it inoperative for the purpose for which it is intended. It will be obvious, therefore, that for a liquid spring to be of any commercial value there must be provided in the spring a seal which is capable of sealing the liquid against all types of leakage for long periods of time, such as, for instance, a half million reciprocal strokes. This must be done not only under the tremendous pressures developed and despite the relative reciprocatory movement of the parts of the spring, but sometimes also under high operating temperatures and in hot corrosive atmospheres, etc. such as those to which conventional steel springs are subjected.

Conventional seals are wholly inadequate to the task of sealing liquid springs that have to be subjected to continuous use. As a consequence, heretofore liquid springs have only been used for aircraft landing gears and in similar installations. In such installations, the spring is subjected to only a few cycles over a long period of operation of the aircraft, because the landing gear is in operation only a small percentage of the time that the airplane itself is operable. In addition the spring is continuously serviced and checked for it is customary to service aircraft regularly after each flight, and the topping off or addition of fluid to an aircraft landing gear is therefore of little concern.

In a machine tool application, for instance, however, a punch press, for example, the liquid spring must be subjectable to continuous usage; and the life of the spring and its uniformity of operation are of paramount importance. Unless a liquid spring can run at least 150,000 cycles prior to any servicing or extended leakage, that spring would be of no possible commercial use, for instance, in diemaking or like fields. This is particularly true since a liquid spring must compete with overloaded steel springs which have a cycle life of approximately 35,000 to 40,000 cycles when stressed at an operating stress of say 150,000 p. s. i., and which may cost as little as one-thirtieth of the cost of a liquid spring. In addition to the greater forces developed, for commercial success the life of the liquid spring before servicing must be sufficiently greater than the life of a steel spring to offset not only the much cheaper price of the steel spring but also the labor cost involved in pulling a die down to replace the steel springs previously used.

The required liquid spring life can only be attained through use of a sealing medium, that will provide this extended life. Another requirement for a satisfactory seal design for diemaking and like applications is that the friction of the seal in the spring device be practically zero, even though the pressures it exerts on the wall of the cylinder must obviously be as great as the pressures of the liquid which is tending to bypass the seal. The problem is further complicated by reason of the fact that the silicone base liquids, which are the only liquids known that have the desired compressibility of 20% at 50,000 p. s. i., are in themselves deleterious to friction-free operation and tend to remove all natural oil films from the metal of the chamber in which a piston operates. A still further requirement of a satisfactory seal for a continuously operable liquid spring is that the seal provide not only a comparatively dense and firm bearing for high pressure sealing in operation but also a low pressure static sealing when the spring is at rest.

Since only a composite high pressure seal could possibly be used in a liquid spring, because of the pressures involved, it is obvious that during filling of the spring with liquid and during the low pressure range of the spring stroke, low pressure sealing of the spring is absolutely essential. Low-pressure sealing is critical during filling because the loads which the spring will develop are determined by the quantity of liquid which is metered into the spring during filling; and obviously if leakage should occur after or while the measured quantity of liquid was being poured into the spring chamber, the load attainable by the spring would be lowered, thus making the spring loading unpredictable. It should be obvious, also, that in the operation of a liquid spring during the initial part of the piston stroke the spring is operating under low pressure; yet the sealing must be complete in this range as well as in the high pressure range, for leakage at this time would also reduce the load capacity of the spring. During the first ¼" of the stroke of the spring referred to above, for instance, a pressure of only 10,000 p. s. i. might be developed under certain conditions, but sealing nevertheless at this stage is critical, just as it is critical at the higher pressure of 50,000 p. s. i. that may be developed during the further part of the piston stroke.

One object of the present invention is to provide a seal for reciprocable pistons which under high pressures will have zero leakage.

Another object of this invention is to provide a high pressure seal for liquid springs, in which the loss due to the friction of the seal is negligible.

A further object of this invention is to provide a seal adapted to seal liquids at low as well as high pressures.

Another object of this invention is to provide a seal for a liquid spring which is rigid, durable, unaffected by friction, and yet which possesses sufficient resiliency to effect static sealing when the spring is at rest.

A further object of this invention is to provide a seal which is flexible enough to pass over irregularities in the bore in which it operates without wear.

Another object of the invention is to provide a seal constructed so that the pressure of the liquid itself on the seal serves only to increase the sealing action.

Another object of the invention is to provide a seal for a liquid spring in which the coefficient of friction is low and only increases in direct proportion to the liquid pressure in the spring.

A further object of the invention is to provide a seal adapted to seal a precise amount of liquid in a liquid spring during filling and until higher seal-setting pressures are developed.

Another object of the invention is to provide a seal which is operative under both low and high pressures.

A still further object of this invention is to provide a composite seal for a liquid spring which comprises both a dynamic sealing portion and a static sealing portion.

Another object of the invention is to provide a seal that is impervious to the action of silicone base liquids, and that will have no deleterious effect on the iron, steel or any other metal on which it slides in the presence of silicone liquids in the operation of the liquid spring.

Still another object of the invention is to provide a seal that is practically friction free in operation in the presence of liquids such as silicone base liquids.

Other objects of this invention will be apparent hereinafter from the description and from the recital of the appended claims.

In the drawing:

Fig. 1 shows a liquid spring constructed generally according to the inventions of copending applications Serial Nos. 180,966, 228,245 and 228,215, which are assigned to the assignee of the present application, and showing two of my novel seals in use therein, parts being broken away and shown in section;

Fig. 2 is an enlarged fragmentary axial section of the main sealing element of one of the seals shown in Fig. 1;

Fig. 3 is an enlarged fragmentary section of the left-hand side of the spring shown in Fig. 1, showing the positions of the parts of one of the seals while the spring is being filled with liquid and before the initial spring operation;

Fig. 4 is a section similar to Fig. 3 but showing this seal after initial pressurization;

Fig. 5 is a fragmentary axial section on an enlarged scale, illustrating a modification of this main sealing element; and Fig. 6 is an enlarged fragmentary axial section of the main sealing element of the other seal shown in Fig. 1.

Referring now to the drawing by numerals of reference, Fig. 1 discloses a liquid spring 20 of a type having a chamber 21, which is closed at one end and which has a piston-carrying head 22 threaded into the other end thereof. The head 22 has a bore 23 in which the piston reciprocates; and it is similar to that shown in application Serial No. 228,245 above-mentioned. The piston 24 operates within the bore 23 and has a portion 28 projecting outwardly beyond the head. It is retained within the head by a nut 25 in the manner shown in copending application Serial No. 228,215 above-mentioned. The piston 24 has a shank portion 26 of reduced diameter. Mounted on the shank portion 26 of the piston and retained thereon by a cap 27 is a seal 30 made according to one embodiment of this invention. Cap 27, as will be seen, is threadedly engaged at 29 to retain the seal 30 thereon. The cap is provided to prevent the seal from dropping down into the liquid in chamber 21, should the seal become worn before extended service, or when the piston 24 is removed for servicing. It has clearance with reference to bore 23.

Basically this seal 30 comprises two elements designed to provide effective sealing during assembly and at all the various stages of pressure of the liquid in the spring encountered in use. These stages of pressure may vary from zero or below, or some small initial preload, to the high loads, say from a p. s. i. of 1,000 initially to a maximum p. s. i. of 20,000 to 50,000. The two sealing elements are, respectively, a dense, relatively rigid, preferably plastic sleeve 35, which is distortable under medium pressures and compressible under high pressures to a limited degree, for purposes which will be disclosed hereinafter, and a soft, resilient, distortable, pressure-providing, annular member 36. The dense, relatively rigid sleeve 35 serves to seal the piston dynamically; and the soft, resilient annulus 36 acts both as a seal during initial assembly and as a servo for actuating the sealing sleeve 35 and also seals its static side on the piston shank 26. The annulus 36 may be, as shown, a conventional O-ring, such as is customarily used to seal pressures up to 3,000 p. s. i.

In Fig. 2, the dense, annular, preferably plastic sleeve comprising the main element of my novel seal is shown. This sleeve is generally cylindrical in shape. For best results, it preferably has a length at least one-half its diameter with a thickness in this size of approximately one-fifth its length. It has a V-shaped groove 37 at its inner end whose sides 38 and 39 are of unequal length. The inner angular sealing face 38 has an angularity approximately equal to the outer face 39 but is shorter in length. The outer, dynamic sealing side 39 is generally slightly longer than the thickness of the cross-section of the sleeve. This V-shaped groove 37 is adapted to receive the O-ring 36. Its face or leg 39 intersects the outside surface 40 of the sleeve so as to form an outer angular lip 45 which is thin enough to be flexible. The locking faces 38 and 39 of the groove extend at angles A and B of 20°, or slightly less, to the inside and outside surfaces 41 and 40, respectively, of the sleeve, to effect the locking of the soft O-ring 36 therebetween as further described hereafter.

The inner surface 41 of the sleeve 35 is cylindrical, but has clearance with reference to the shank portion 26 of the piston 24 when the sleeve is not in sealing position. The outer surface 40 of the sleeve is stepped. It is of larger diameter in the portion 42 adjacent the inner end of the sleeve and is of reduced diameter on the major portion 43 of its length, the outside surface 40' of the major portion of the sleeve being relieved back of the portion 42. The reduction in thickness of the major portion 43 of the sleeve is intended to reduce the friction where friction is critical; it is where the up and down loads of the resilient liquid spring must be approximately equal with no friction losses. This same result may be attained obviously by tapering the thickness of the sleeve from a maximum at its inner end.

Fig. 5 illustrates a slightly modified form of sealing sleeve 55. Here the outside and inside walls 56 and 57 are cylindrical and parallel for the full height of the sleeve. That is, the sleeve 55 is of uniform thickness except for the grooved portion thereof at its inner end. This grooved portion is similar in construction to that of the sleeve 35. The groove 60 has side walls 58 and 59 of unequal length, outside wall 59 being again the longer and being slightly longer than the thickness of the sleeve in cross-section. The walls 58 and 59 are again inclined to one another at an angle to lock therein an O-ring 36; and side wall 59 also intersects outside surface 56 of the sleeve to provide a thin-edged flexible annulus capable of engaging the bore 23 of head 22 in sealing engagement. The modification illustrated in Fig. 5 is a somewhat cheaper construction which can be used where the up and down losses due to friction are not considered critical.

We shall now consider the application of the seal to the liquid spring disclosed herein. We shall refer first to Fig. 3, which shows the initial positions of the two sealing elements 35 and 36 in relation to the wall 47 of the bore 23 of head 22, and to the reduced shank portion 26 of the piston 24. It will be noted that in the initial positions, prior to any stroke of the piston in the bore, O-ring 36 has not yet entered the groove 37 in sleeve 35 but is riding tightly against the bore 23 and against the reduced shank portion 26 of piston 24, effecting an initial seal therebetween. It will be noted further that the hard plastic material of sleeve 35 is not in contact with the bore 23; actually there is a gap 65 therebetween which is, of course, somewhat reduced opposite the portion 42 of the sleeve. It will be further obvious that there is another gap 66 between the inner surface 41 of sleeve 35 and the inner face or reduced shank portion 26 of the piston 24. This is the initial position of the parts prior to any stroke of the machine in which the spring is used.

We shall now refer to Figure 4, which shows the relative positions of the parts of the composite seal after the initial preload is put on the piston. This is also the configuration found throughout the entire operating cycle of the spring. It will be noted that sealing ring 36 is no longer in contact with the bore 23, being entirely contained between the lip portion 45 of sleeve 35 and the portion 26 of the piston 24. This is the position of the sealing ring 36 for all future operation of the spring. It is tightly wedged in groove 37 (or groove 60 in the case of sleeve 55) in locking wedge action so that in effect it is no longer a free member. In this locked wedged position, O-ring 36 is in tight sealing engagement with the shank portion 26 of piston 24 so that leakage of the compressible liquid of the spring down shank section 26 is prevented. It will be obvious that ring 36 is in effect a static seal. This is an important feature of this element, since under pressure, particularly low pressure, there may be left a gap 66 between the inside wall of the sleeve 35 and the outside surface of the shank portion 26 of the piston, and unless this rubber O-ring 36 were present, leakage would occur down the shank 26 through gap 66 resulting in failure of the liquid spring.

O-ring 36, it will be observed, in this position is also acting as a servo, exerting outward pressure against lip 45 of sleeve 35, forcing the lip 45 into tight contact with the bore 23 so as to effect sealing along the inside surface of bore 23. In effect all the resiliency of the soft rubber ring 36 is transferred through the dense hard plastic material of sleeve 35 to effect sealing in bore 23. In low initial pressures this servo action is extremely important, otherwise minute quantities of fluid would bypass the lip section 45 resulting in gradual leakage, and ultimate failure of the spring. It however will be obvious that with the construction and arrangement herein described, the working fluid pressure behind the seal operates on the soft O-ring 36, which is in effect liquid itself at working pressures of the spring, causing it to flow and force sealing lip 45 out into tighter contact with the bore 23 to effect sealing of the spring.

It will further be noted that as pressures become greater there is actually cold flow of the dense hard plastic material forming seal 35 so that it actually will seal also along its inside surface 41, that is, along the shank 26 as is shown in Fig. 4. Actually under much higher pressures the gap shown in Figure 4 between seal 35 and bore 23 behind lip 45 entirely fills due to cold flow of the material. This occurs at pressures approaching 20,000 p. s. i. and beyond. However it will be apparent that when this occurs the pressures and forces generated by the spring are so great that the percentage of friction loss, while high from the standpoint of force required, is actually low in relation or ratio to the spring pressures generated. It is this reduction in ratio which is important and which is caused by the relief shown.

If the configuration is such as shown in Fig. 5, the entire body is tightly wedged between the bore 23 and the outer wall of shank 26. This, of course, because of the greater contact causes and effects a friction loss which, while not serious in many applications, is serious where the up and down pressures of the spring must be the same. In an application where the up and down pressures of the spring must be the same, a seal member such as shown in Fig. 4 is essential, although slightly more costly to manufacture.

The main sealing member 35 or 55 is made of dense hard plastic material. Preferably it is made of one of the bearing nylons, such as FM 10001 and 3001, which are high strength structural nylons. This part can also be made, however, of high strength structural vinyls, the essential feature of the sleeve 35 or 55 being that it be of a good bearing material having a low coefficient of friction, even though pressurizing the straight bore 23, and yet having long life and resiliency and some compressibility to effect the necessary sealing.

The liquid spring shown is, as previously stated, of the general configuration of that disclosed in the copending application of George F. Wales, Serial No. 180,966, assigned to the assignee of the present application. In this spring a force adjuster or a means for compensating for load loss or load adjustment is employed shown herein generally at 100 (Fig. 1). This force adjuster, as disclosed more fully in copending application No. 180,966, comprises an adjustable piston member 101 that threads into the closed end of spring 20 for varying the internal volume of the spring to change the force available from piston 24 by changing the enclosed volume of the chamber 21.

Force adjuster 100 is used either to adjust the load after the spring is in place or to compensate for any leakage which may occur beyond piston 28 during the life of the spring. Piston 101 operates in a seal 130 (Figs. 1 and 6) which, in this essentially static application, is a female type of seal. This type of seal may be used also, however, in place of seal 30 in certain types of applications where its advantages outweigh the use of a male seal. The construction used in this female type of seal is similar to that used in the male seal but the main sealing element 135 of this seal has its extended lip 145 on the inside instead of on the outside. It seats against the surface at which relative movement occurs, which in this instance is internal rather than external.

The main sealing element 135, like the main sealing elements 35 and 55 previously described, is a sleeve of generally cylindrical shape, and has a V-shaped groove 137 at its inner end whose sides are of unequal length. This groove is adapted to receive an O-ring as in the previously described embodiments. In the case of member 135, however, the longer side of the groove 137 is at the inside and the shorter side of the groove is at the outside. Thus, an inner flexible lip 145 is provided at the inside, which seals the moving contact between threadably-adjustable piston 101 and the spring housing, and a shorter lip 138 is provided at the outside, which has static sealing engagement with the wall of the spring housing. The O-ring (not shown) acts as in the previously described embodiments as a servo, but it acts here as a servo for the inner lip 145.

Seal element 135 is of enlarged internal diameter for the greater portion 143 of its length, the inside surface 140' of the sleeve being relieved back of portion 142 thereof. The outside surface 141 of this sleeve is cylindrical and of the same diameter for its full height.

It will be noted from the disclosures of Figs. 2 and 6 in conjunction with the observations of the action of Figs. 3 and 5 that in all instances the extended lip, whether it be a male or female sealing element, is always against the moving part, while the short lip is against the static or immovable part. It will also be obvious from this that either type of seal can be employed with equal facility providing the general features noted above are followed with respect to the installation.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:
1. The combination with a liquid spring that has a container for the liquid, a cylinder open at its inner end into said container, and a piston reciprocable in said cylinder and having a stem portion projecting outwardly beyond the other end of said cylinder, of a seal for sealing against leakage of liquid from said container, said seal comprising a plastic sleeve that has a V-shaped groove at its inner end and that is mounted in a peripheral groove in said piston and that surrounds said piston between the piston and the inside wall of the cylinder, and a solid resilient annulus that has a normal thickness greater than the width of the space between the piston and said inside cylinder wall, said sleeve being normally of less thickness than the width of space between the piston and the inside wall of the cylinder, and said V-shaped groove having a radially outer wall of greater length than its radially inner wall to form with the adjacent portion of the outer wall of said sleeve a flexible lip, said annulus being positioned initially inwardly of said sleeve in sealing engagement with both the piston and the inside wall of said cylinder and being adapted to be lodged under pressure in said V-shaped groove between said flexible lip and said piston to engage said piston in static sealing engagement and to force said lip radially outwardly into dynamic sealing engagement with said inside cylinder wall.

2. In fluid pressure apparatus, the combination with a pair of parts, which are movable relative to one another and one of which surrounds the other but is spaced radially therefrom, of a seal between said parts, said seal comprising a plastic sleeve and a distortable, resilient ring member, both said sleeve and said ring member surrounding the inner of said parts and being mounted between said parts, one of said parts being provided with a shoulder, said sleeve seating at one end against said shoulder to be fixed against axial movement relative to said shouldered part, said sleeve having a coaxial V-shaped circular groove in its opposite end, said V-shaped groove having bounding walls at opposite sides of different lengths, the bounding wall of said groove which is adjacent the side of dynamic sealing between said sleeve and the part which is movable relative to said shouldered part being of greater length than the other bounding wall of said groove, said longer bounding wall forming with the adjacent side of said sleeve a flexible, annular lip, said lip being adapted to engage in sealing engagement the part which is movable relative to said shouldered part, said lip being normally spaced from the part which it is adapted to engage, said ring member being normally of greater thickness than the space between said pair of parts, said ring member being compressed into said groove, said ring member exerting radial pressure on said lip to hold said lip in dynamic sealing engagement with the part which it engages, said ring member being held by said longer wall of said groove out of contact with the part which said lip engages but extending axially beyond the other wall of said groove and engaging the other part in static sealing engagement.

3. In fluid pressure apparatus, the combination with a pair of parts, one of which is movable inside the other, the inner of said parts being provided with a peripheral shoulder and being considerably smaller in diameter beyond said shoulder than the outer of said parts, of a seal for sealing said parts against leakage of fluid therebetween, said seal comprising a plastic sleeve and a distortable, resilient, rubber-like O-ring, said sleeve surrounding said smaller diameter portion of said inner part and seating at one end against said shoulder and having a V-shaped circular groove in its opposite end, said groove having an outside bounding wall that is of greater length than its inside bounding wall, said outside bounding wall forming with the adjacent outside wall of said sleeve a flexible lip adapted to bear against the outer of said pair of parts, said O-ring being normally of greater thickness than the space between said pair of parts and having a normal thickness greater than the width of said groove but being compressed into said groove and lying behind said lip out of contact with said outer part but forcing said lip into dynamic sealing engagement with said outer part, said O-ring extending axially of said sleeve beyond the inside bounding wall of said groove and engaging said inner part in static sealing engagement.

4. In fluid pressure apparatus, the combination with a pair of parts, one of which is movable inside the other, the inner of said parts being provided with a peripheral shoulder and being considerably smaller in diameter beyond said shoulder than the outer of said parts, of a seal for sealing said parts against leakage of fluid therebetween, said seal comprising a plastic sleeve and a distortable, resilient rubber-like O-ring, said sleeve surrounding said smaller diameter portion of said inner part and seating at one end against said shoulder and having a V-shaped circular groove in its opposite end, said groove having an outside bounding wall that is of greater length than its inside bounding wall, said outside bounding wall forming with the adjacent outside wall of said sleeve a flexible lip adapted to bear against the outer of said pair of parts, said O-ring being normally of greater thickness than the space between said pair of parts and having a normal thickness greater than the width of said groove but being compressed into said groove and lying behind said lip out of contact with said outer part but forcing said lip into dynamic sealing engagement with said outer part, said O-ring extending axially of said sleeve beyond the inside bounding wall of said groove and engaging said inner part in static sealing engagement, and said sleeve being of greater outside diameter at the end adjacent said groove than for the rest of its length.

5. In fluid pressure apparatus, the combination with a pair of parts, one of which is movable inside the other, the inner of said parts being provided with a peripheral shoulder and being considerably smaller in diameter beyond said shoulder than the outer of said parts, of a seal for sealing said parts against leakage of fluid therebetween, said seal comprising a plastic sleeve and a distortable, resilient, rubber-like O-ring, said sleeve surrounding said smaller diameter portion of said inner part and seating at one end against said shoulder and having a V-shaped circular groove in its opposite end, said groove having an outside bounding wall that is of greater length than its inside bounding wall, said outside bounding wall forming with the adjacent outside wall of said sleeve a flexible lip adapted to bear against the outer of said pair of parts, said O-ring being normally of greater thickness than the space between said pair of parts and having a normal thickness greater than the width of said groove but being compressed into said groove and lying behind said lip out of contact with said outer part but forcing said lip into sealing engagement with said outer part, said O-ring extending axially of said sleeve beyond the inside bounding wall of said groove and engaging said inner part in static sealing engagement, and said outer bounding wall of said groove being longer than the thickness of said sleeve.

6. In fluid pressure apparatus, the combination with a pair of parts, one of which is movable inside the other, the inner of said parts being provided with a peripheral shoulder and being considerably smaller in diameter beyond said shoulder than the outer of said parts, of a seal for sealing said parts against leakage of fluid therebetween, said seal comprising a plastic sleeve and a distortable, resilient, rubber-like O-ring, said sleeve surrounding said smaller diameter portion of said inner part and seating at one end against said shoulder and having a V-shaped circular groove in its opposite end, said groove having an outside bounding wall that is of greater length than its inside bounding wall, said outside bounding wall forming with the adjacent outside wall of said sleeve a flexible lip adapted to bear against the outer of said pair of parts, said O-ring being normally of greater thickness than the space between said pair of parts and having a normal thickness greater than the width of said groove but being compressed into said groove and lying behind said lip out of contact with said outer part but forcing said lip into sealing engagement with said outer part, said O-ring extending axially of said sleeve beyond the inside bounding wall of said groove and engaging said inner part in static sealing engagement, and said outer bounding wall of said groove being longer than the thickness of said sleeve, and said sleeve having a length at least five times its thickness.

7. In fluid pressure apparatus, the combination with a cylinder and a piston reciprocable in said cylinder, of a seal for sealing against leakage of fluid along said piston, said seal comprising a dense, relatively rigid, plastic sleeve, and an annular, soft, rubber-like ring, said sleeve surrounding said piston between said piston and the inside cylinder wall and being normally of less thickness than the space between said piston and said cylinder wall, said sleeve having a V-shaped circular groove in its axially inner end, said groove having bounding walls of different lengths, the radially outer bounding wall being of the greater length and forming with the outside wall of said sleeve a flexible lip, said ring being normally of greater thickness than said space between said piston and said inside cylinder wall and having a normal thickness greater than the width of said groove but being compressed by pressure of fluid in said cylinder into said groove and lying behind said lip out of contact with said inside cylinder wall but exerting radially outward pressure on said lip to force said lip into dynamic sealing engagement with said inside cylinder wall, and said ring extending axially of said sleeve beyond the radially inner bounding wall of said groove to engage said piston in static sealing engagement.

References Cited in the file of this patent

UNITED STATES PATENTS

| | | |
|---|---|---|
| 1,362,435 | Neraas | Dec. 14, 1920 |
| 1,955,157 | Wayne | Apr. 17, 1934 |
| 2,333,096 | Dowty | Nov. 2, 1943 |
| 2,456,356 | Aber | Dec. 14, 1948 |
| 2,549,818 | Joy | Apr. 24, 1951 |
| 2,658,809 | Schultz | Nov. 10, 1953 |

FOREIGN PATENTS

| | | |
|---|---|---|
| 105,053 | Great Britain | Mar. 21, 1917 |
| 749,942 | Germany | Dec. 8, 1944 |